United States Patent
Zubrod

(10) Patent No.: US 9,932,269 B2
(45) Date of Patent: *Apr. 3, 2018

(54) HIGH STRENGTH, DENSITY CONTROLLED COLD FUSION CONCRETE CEMENTITIOUS SPRAY APPLIED FIREPROOFING

(71) Applicant: Geopolymer Solutions LLC, Coral Springs, FL (US)

(72) Inventor: Rodney Zubrod, The Woodlands, TX (US)

(73) Assignee: Geopolymer Solutions LLC, Coral Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/474,074

(22) Filed: Mar. 30, 2017

(65) Prior Publication Data

US 2018/0037506 A1    Feb. 8, 2018

Related U.S. Application Data

(62) Division of application No. 15/228,829, filed on Aug. 4, 2016, now Pat. No. 9,670,096.

(51) Int. Cl.
| | | |
|---|---|---|
| *C04B 28/08* | (2006.01) |
| *C09D 5/18* | (2006.01) |
| *C04B 14/22* | (2006.01) |
| *C04B 14/20* | (2006.01) |
| *C04B 22/08* | (2006.01) |
| *C04B 22/00* | (2006.01) |
| *C04B 14/44* | (2006.01) |
| *C04B 14/04* | (2006.01) |
| *C04B 24/14* | (2006.01) |
| *C04B 14/18* | (2006.01) |
| *C04B 18/08* | (2006.01) |
| *C04B 103/22* | (2006.01) |
| *C04B 103/12* | (2006.01) |
| *C04B 111/00* | (2006.01) |
| *C04B 111/28* | (2006.01) |

(52) U.S. Cl.
CPC .............. *C04B 28/08* (2013.01); *C04B 14/04* (2013.01); *C04B 14/18* (2013.01); *C04B 14/202* (2013.01); *C04B 14/22* (2013.01); *C04B 14/44* (2013.01); *C04B 18/08* (2013.01); *C04B 22/0013* (2013.01); *C04B 22/08* (2013.01); *C04B 24/14* (2013.01); *C09D 5/18* (2013.01); *C04B 2103/12* (2013.01); *C04B 2103/22* (2013.01); *C04B 2111/00448* (2013.01); *C04B 2111/28* (2013.01)

(58) Field of Classification Search
CPC ....... C04B 28/08; C04B 14/22; C04B 14/202; C04B 14/44; C04B 14/04; C04B 14/18; C04B 18/08; C04B 22/08; C04B 24/14; C04B 2103/22; C04B 2103/12; C04B 2111/00448; C04B 2111/28; C09D 5/18
See application file for complete search history.

(56) References Cited

U.S. PATENT DOCUMENTS

| | | | | |
|---|---|---|---|---|
| 9,670,096 B1 * | 6/2017 | Zubrod | .................... | C04B 28/08 |
| 9,725,365 B1 * | 8/2017 | Zubrod | ................. | C04B 28/021 |
| 2012/0286190 A1 * | 11/2012 | Prat | ........................ | C04B 28/06 252/62 |
| 2014/0047999 A1 * | 2/2014 | Razl | ........................ | C04B 18/08 106/676 |

FOREIGN PATENT DOCUMENTS

| | | | | |
|---|---|---|---|---|
| WO | WO 2006070960 A1 * | 7/2006 | ............. | C04B 28/00 |
| WO | WO 2014176414 A1 * | 10/2014 | ............. | C04B 28/02 |

\* cited by examiner

*Primary Examiner* — Anthony J Green

(74) *Attorney, Agent, or Firm* — The Concept Law Group, PA; Lance Johnson; Scott D. Smiley

(57) ABSTRACT

A density controlled cold fusion concrete cementitious spray applied fireproofing material including a mixture of water, one or more of silicon dioxide, expanded glass, vermiculite, bottom ash, perlite, expanded shale, or other lightweight aggregates of various diameter sizes ranging from about 0.025 mm to about 12.5 mm in diameter; anhydrous or hydrous sodium or potassium metasilicate; waste from steel production consisting of Granulated Ground Blast Furnace Slag (GGBFS); high calcium or low calcium waste from coal combustion (fly ash or bottom ash); sodium tetraborate, sodium citrate dihydrate, citric acid, or boric acid; and an alkali-resistant micro-.

18 Claims, No Drawings

HIGH STRENGTH, DENSITY CONTROLLED COLD FUSION CONCRETE CEMENTITIOUS SPRAY APPLIED FIREPROOFING

REFERENCE TO RELATED APPLICATIONS

This application is a divisional of U.S. Ser. No. 15/228,829, filed Aug. 4, 2016, the contents of which are incorporated herein by reference in their entirety.

FIELD OF THE INVENTION

This invention relates to spray applied fireproofing materials and methods for their manufacture, for protecting steel, wood, concrete, and other construction and industrial materials that require protection from unexpected fire events. More particularly, the invention relates to spray applied fireproofing materials and methods for their manufacture, that significantly reduce the generation of carbon dioxide and other green-house gases during production, unlike Portland Cement and typical Geopolymer cements. Most particularly, this invention relates to an entirely novel approach of using a Geopolymer type of cement spray applied fireproofing material for strength, bonding, and heat resistance, respectively, which demonstrates dynamic characteristics which provide for elevated resistance to heat, elevated compressive strength, elevated bond strength, and elevated corrosion protection on steel features upon which it is placed.

BACKGROUND OF THE INVENTION

Cementitious spray applied fireproofing is not a new concept. For example, it is well known to spray apply fireproofing slurries to metal structural members and other building surfaces in order to provide a heat resistant coating thereon. U.S. Pat. Nos. 3,719,513 and 3,839,059, which are incorporated herein by reference, disclosed gypsum-based formulations that contain, in addition to the gypsum binder, a lightweight inorganic aggregate such as vermiculite, a fibrous substance such as cellulose, and an air entraining agent.

Furthermore, geopolymer types of cement, per se, are well-known. However, the use of geopolymer types of cement and concrete formulations in spray applied fireproofing is new. While Geopolymer types of cement have been studied extensively and it has been concluded that heat resistance is typically relatively high when compared to Portland cement, the challenges in using a Geopolymer type of cement in a density controlled, cold fusion mixture were both problematic and arduous.

As will be herein explained, the present inventors have solved these challenges, and reduced to practice a density controlled cold fusion concrete cementitious spray applied fireproofing.

DESCRIPTION OF THE PRIOR ART

WO 2015/144796A1 discloses a fireproofing cementitious coating composition containing organic polymers and blast furnace slag. The invention provides a composition having a bulk density of 0.8 g/cm3 or less comprising (a) 25-65 weight % of an inorganic binder comprising (i) 83 to 100 weight % of calcium aluminate cement, (ii) 0 to 14 weight % of calcium sulphate, (iii) 0 to 9 weight % of Portland cement wherein the weight % of (i), (ii), (iii) is based on the sum of (i)+(ii)+(iii), (b) 0.5-15 weight % of one or more organic polymers, (c) 30-75 weight % of one or more inorganic fillers wherein the bulk density of the fillers is less than 0.5 g/cm3, wherein weight % is calculated on the total weight of all the non-volatile components in the composition.

U.S. Pat. No. 5,718,759 discloses a fire-stopping cementitious material made from pozzolanic aggregate and a blend of Portland cement and ground blast slag (Column 1, Lines 15-20; Column 1, Lines 58-67; Column 2, Lines 57-65; Column 6, Lines 5-24). A cementitious composition is disclosed which is useful for water-resistant construction materials, including floor underlayments, backing boards, self-leveling floor materials, road patching materials, fiberboard, fire-proofing sprays, and fire-stopping materials includes about 20 wt. % to about 75 wt. % calcium sulfate beta-hemihydrate, about 10 wt. % to about 50 wt. % Portland cement, about 4 wt. % to about 20 wt. % silica fume and about 1 wt. % to about 50 wt. % pozzolanic aggregate. The Portland cement component may also be a blend of Portland cement with fly ash and/or ground blast slag.

U.S. Pat. No. 8,519,016 discloses a lightweight cementitious binder composition containing fly ash, alkali metal salt of citric acid, alkali metal silicate, foaming agent for entraining air, and water (Column 3, Lines 46-62; Column 4, Lines 20-25; Column 4, Lines 60-67; Column 8, Lines 1-5). The invention is directed toward a method of making a lightweight cementitious binder composition with improved compressive strength for products such as cementitious panels. The method mixes fly ash, alkali metal salt of citric acid, alkali metal silicate, foaming agent for entraining air, water and in the preferred embodiment a foam stabilizing agent. Compositions which include fly ash selected from the group consisting of class C fly ash, class F fly ash and mixtures thereof, alkali metal salts of citric acid, alkali metal silicates, foaming agents, and preferably a foam stabilizer, such as polyvinyl alcohol, and do not require use of set retarders. Compositions containing class F fly ash can optionally contain Type III Portland cement.

U.S. Pat. No. 8,167,998 discloses a lightweight ready-mix concrete composition containing coarse aggregate combination such as ground granulated blast furnace slag, fly ash, glass, silica, expanded shale, perlite, and/or vermiculite, as well as set retarders such as borates. In its broadest context, the patent discloses a lightweight ready-mix concrete composition that contains 8-20 volume percent cement, 11-50 volume percent sand, 10-31 volume percent prepuff particles, 9-40 volume percent coarse aggregate, and 10-22 volume percent water, where the sum of components used does not exceed 100 volume percent. The prepuff particles have an average particle diameter of from 0.2 mm to 8 mm, a bulk density of from 0.02 g/cc to 0.64 g/cc, an aspect ratio of from 1 to 3. The slump value of the composition measured according to ASTM C 143 is from 2 to 8 inches. After the lightweight ready-mix concrete composition is set for 28 days, it has a compressive strength of at least 1400 psi as tested according to ASTM C39.

WO 2016/016385A1 discloses a geopolymer used as a binder for fire resistant insulating material (Page 1, Lines 3-7; Page 6, Lines 2-9; Page 7, Lines 30-33; Page 8, Lines 5-15). The reference illustrates use of a geopolymer in a coating composition for a building construction component, a coated component for use in building construction wherein the coating comprises a geopolymer, a method of coating a component comprising applying a curable geopolymer mixture to a surface of the component and curing the mixture to form a cured geopolymer coating, and the use of a geopolymer as a mortar.

U.S. Patent Publication No. 2014/0047999 discloses an acid and high temperature resistant cement composite containing fly ash and ground slag. The patent is largely directed toward a process for the production of acid and high temperature resistant cement composites, where the matrix is alkali activated F fly ash alone, F Fly ash combined with ground slag or ground slag alone. F-fly ash produces lower quality alkali activated cement systems. On the other hand, the lack of calcium oxide results in very high resistance to medium and highly concentrated inorganic or organic acids. The high strength and low permeability of pure F-fly ash cement systems is achieved by using in the composition un-densified silica fume, the amorphous silicon dioxide obtained as by products in production of ferro-silicones. Precipitated nano-particle silica made from soluble silicates and nano-particle silica fume produced by burning silicon tetra chloride in the hydrogen stream.

U.S. Patent Publication No. 2015/0321954 discloses a geopolymer cement containing fly ash and granulated blast furnace slag. The patent discloses a solid component activator for use in a geopolymer cement containing a silico-aluminate material comprising a mixture of sodium silicate and sodium carbonate for activating the geopolymer cement by increasing reactivity of the silico-aluminate material in the geopolymer cement when forming geopolymer concrete.

EP 0807614B1 discloses a spraying concrete containing calcium aluminate glass, aluminum silicate, and pozzolanic material.

In reviewing the prior art, it appears that none of the references teach all of the elements required to be present in the density controlled cold fusion concrete cementitious spray applied fireproofing, as disclosed herein.

Furthermore, none of the prior art references appear to teach or suggest the disclosed utilization of alkali-resistant micro-fibers to improve rheology strength; or the use of a protein or synthetic protein material for altering the ion concentration of the hydroxides and silicates for the purpose of retaining water, maintaining a consistent volume during the curing process, and to reduce the sticky/tacky characteristic of silicates in the instantly disclosed density controlled cold fusion concrete cementitious spray applied fireproofing.

SUMMARY OF THE INVENTION

The present invention is directed towards materials, and methods for producing a density controlled cold fusion concrete cementitious spray applied fireproofing for use in the construction and maintenance industries for protecting steel, wood, concrete, and other construction and industrial materials that require protection from unexpected fire events.

One purpose for developing the product of the present invention is to provide a formulation which significantly reduces the generation of carbon dioxide and other greenhouse gases during production, unlike Portland Cement and typical Geopolymer cements.

A unique challenge in developing the formulation was to overcome geopolymer degradation and fluxing at exposure temperatures of around 1,000 to 1,200 degrees Fahrenheit. This was accomplished by designing a sacrificial and lightweight particle system that dissipated temperatures during 1, 2, and 3-hour exposures to 2,000 degrees Fahrenheit, without experiencing a temperature change of greater than 999 degrees Fahrenheit to underlying steel during the exposure period, and less temperature with greater thicknesses to less durable substrates such as wood and concrete.

Analysis of the test results and temperature dissipation system of the present invention at 2,000 degrees Fahrenheit clearly identifies that temperature dissipation at greater and less than 2,000 degrees Fahrenheit occurs, with variable relative system thicknesses applicable for other temperatures; 2,000 degrees Fahrenheit testing was chosen based upon current standard industry practice as prescribed by the American Society for Testing and Materials (ASTM), and Underwriter Laboratories (UL).

Another unique challenge was balancing mixture constituents to achieve a constructed design equilibrium density of below 60 pounds per cubic foot (pcf) for heat resistance and feature structural unit weight purposes, while maintaining a compressive strength above 1,000 pounds per square inch (psi) for durability purpose.

Cold fusion concrete formulations utilize glassy activators that mobilize other inherent glassy materials, and polymerizes water into glass and metallic oxides, hydroxides, and hydrates. This polymerization reduces the mass loss during material equilibrium unit weight determinations, which is exacerbated by the increase in lightweight particle specific gravity due to liquid absorption; further exacerbated when the mixture is pressurized during pumping.

These challenges were overcome by utilizing a variable size and type of lightweight aggregate, decreasing the mixtures cohesive (wet) shear strength rheology, thereby reducing pump pressure, and incorporating an entrapped and entrained air structure.

While all of the measures utilized to overcome the challenges are applicable, one or more of the measures are selected based upon the field application, the pump utilized, and the application method in the event no pump is utilized.

Accordingly, it is a primary objective of the instant invention to provide a density controlled cold fusion concrete cementitious spray applied fireproofing material including a mixture of water, acting as a lubricant and activator; one or more of silicon dioxide, expanded glass, glass bubble, aluminum bubble, vermiculite, bottom ash, perlite, expanded shale, or other lightweight aggregates of various diameter sizes dependent upon the application method and ranging from about 12.5 mm to about 0.025 mm's in diameter; anhydrous or hydrous sodium or potassium metasilicate acting as an activator; waste from steel production consisting of Granulated Ground Blast Furnace Slag (GGBFS) acting as a cementitious ingredient; high calcium or low calcium waste from coal combustion (fly ash or bottom ash) acting as a cementitious ingredient; sodium tetraborate, sodium citrate dihydrate, citric acid, or boric acid acting as set-time retarders; and, an alkali-resistant micro-fiber to improve rheology and increase strength.

In some cases, where unit weight and volume change efforts are extra-ordinarily problematic, a protein or synthetic protein material achieving the same characteristics as protein that is able to form a weak covalent bond with the hydroxides and silicates, therein altering the ion concentration of the hydroxides and silicates for the purpose of retaining water, maintaining a consistent volume during the curing process, and to reduce the sticky/tacky characteristic of silicates is utilized. Concentrations of the protein may vary from between about 0.05% (wt/wt) and about 2.5% (wt/wt) of the cementitious mass.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Definitions

As used herein, the term "Portland Cement" refers to any cement referred to by the terms Ordinary Portland Cement (OPC), Portland, Blended Hydraulic Cement, Simple Cement, Blended Pozzolan Cement, Pozzolan Cement, or other industry characterizations or jargon descriptions where the material may be used to bind a composition of mineral aggregates, lightweight aggregates, synthetic aggregates, or no aggregates, water, and chemicals into a mass that hardens and is used in structures or features that may or may not be governed by codes including the International Code Council (ICC), the American Association of State Highway and Transportation Officials (AASHTO), The American Society for Testing and Materials (ASTM), The American Concrete Institute (ACI), or similar International Transportation, Building, or Maintenance Agency. Portland Cement includes modified materials including those blended with Fly Ash and other Pozzolans, high calcium content cements, non-sulfate containing cements, sulfate resistant cements, high-early strength cements, and air-entrained cements.

As used herein, the term "Geopolymer Cement" is an industry term characterizing silicon dioxide and aluminium bearing pozzolans that are activated and bound by alkali's, alkali salts, alkali hydroxides, and oxides, that form a hardened material used in the transportation, building industry, and as a specialty chemical and/or heat resistant concrete. Geopolymer Cements may or may not contain Portland.

As used herein, the term "Cold Fusion Concrete" or "Cold Fusion Cement" are industry terms characterizing silicon dioxide and aluminium bearing pozzolans that are activated and bound by alkali's, alkali salts, and alkali hydroxides and oxides that are inherent to installed pozzolans, that form a hardened material used in the transportation, building industry, and as a specialty chemical and/or heat resistant concrete. Cold Fusion Concrete and Cement may or may not use Portland materials and uses no liquid hydroxide additives as a primary activator or a pH elevator. Cold Fusion Concrete or Cement, in accordance with the present disclosure, provide a high quality, set-time and volume controlled material.

As used herein, the term "Cementitious Materials" refers to a fine grained material, which has cementing value when used in concrete either by themselves, such as Portland cement, blended hydraulic cements, and expansive cement, or such materials in combination with fly ash, other raw or calcined natural pozzolans, silica fume, and/or ground granulated blast-furnace slag.

As used herein, the term "Fumed Silica" refers to a man-made fine grained material, consisting of a minimum 90% silicon dioxide. Silica fume may or may not be pozzolanic. Other fine grained silicon dioxide bearing materials may be substituted such as fine grained mineral clays, ground glass, silicon gel, or other similar materials.

As used herein, the term "Fly Ash" (Class C or Class F) material refers to a coal combustion by-product from power generation that may or may not be classified under the Standard ASTM C618 Specification. Fly ash is the finer product from coal combustion that is collected from the flu-gas stream by electrostatic precipitators and/or baghouses and used in Geopolymer, Portland, and Cold Fusion cements and concrete as a cementitious material and mitigation of alkali-silica reaction. Fly ash may be replaced in whole or in part with silica fume, which is a coal combustion by-product obtained from the flu gas stream, or classified fly ash. Classified fly ash for the purpose intended herein, is a standard Class C or Class F Fly Ash where finer or coarser particles have been separated and either the finer or coarser portion utilized.

As used herein, the term Granulated Ground Blast Furnace Slag (GGBFS) is a by-product obtained during the production (quenching) of metal products and objects including iron, copper, brass, and others. GGBFS typically contains elevated concentrations of silicon dioxide, aluminium, calcium, and other reactive products that when mixed in Geopolymer, Portland, or Cold Fusion cement and concrete, aids in the development of strength and mitigates alkali-silica reaction.

As used herein, the term "Bottom ash" refers to a coal combustion by-product from power generation that is not classified under the Standard ASTM C618 Specification. Bottom ash is the coarse product from coal combustion that is collected from the bottom of the boiler and useful in Geopolymer, Portland, and Cold Fusion cements and concrete as a cementitious material and lightweight aggregate.

As used herein, the term "Set Time Retarders" refers to any dry or liquid admixture added to Portland, Geopolymer, or Cold Fusion cements and concretes to retard the time of setting, and to provide more work-ability time during construction and maintenance efforts of various features. The following are illustrative, albeit non-limiting examples of compounds useful as either set time retarders, and/or activation and rheology enhancers.

(1) Sodium tetraborate also known as borax, sodium borate, or disodium tetraborate, is a boron compound, a mineral, and a salt of boric acid. Powdered sodium tetraborate/borax is white, and contains soft colorless crystals that dissolve easily in water. Sodium tetraborate is many times used as a set time retarder, activation and rheology enhancer for Geopolymers and Cold Fusion types of cement and concrete.

(2) When Portland Cement is used, typical surfactant, lignant, Portland industry set time retarders, rheology modifiers, and water reducers may be used such as those purchased from SIKA, BASF Construction Chemicals, W.R. Grace, Euclid, and other suppliers.

(3) Sodium citrate dihydrate has the chemical formula of $Na_3C_6H_5O_7$. It is sometimes referred to simply as sodium citrate, though sodium citrate can refer to any of the three sodium salts of citric acid. Sodium citrate dihydrate is many times used as a set time retarder, activation and rheology enhancer for Geopolymers and Cold Fusion types of cement and concrete.

(4) Citric acid is a weak organic tribasic acid having the chemical formula $C_6H_8O_7$. It occurs naturally in citrus fruits. In biochemistry, it is an intermediate in the citric acid cycle, which occurs in the metabolism of all aerobic organisms. Citric acid is often times used as a set time retarder, for Geopolymers and Cold Fusion types of cement and concrete.

(5) Boric acid, also called hydrogen borate, boracic acid, orthoboric acid and acidum boricum, is a weak, monobasic Lewis acid of boron often used as an antiseptic, insecticide, flame retardant, neutron absorber, or precursor to other chemical compounds. It has the chemical formula $H_3BO_3$ (sometimes written $B(OH)_3$), and exists in the form of colorless crystals or a white powder that dissolves in water. When occurring as a mineral, it is called sassolite. Boric acid is often useful as a set time retarder for Geopolymers and Cold Fusion types of cement and concrete.

As used herein, the term "High Alumino Silicate Containing Clay" refers to any naturally occurring mineral material useful in Portland, Geopolymer, and Cold Fusion cements and concrete such as Kaolin, Red, and Attapulgite clays that have an organic content of less than 2% (wt/wt), but an elevated silicon dioxide content of at least 40% (wt/wt) and an aluminium content at least 15% (wt/t). Other naturally occurring minerals may be used as replacements including zeolites, diatomaceous earth, volcanic minerals, and other similar materials.

As used herein, the term "Protein" or "Synthetic Protein Material" refers to large biomolecules, or macromolecules, inclusive of one or more long chains of amino acid residues. For the protein to be useful in Geopolymer or Cold Fusion types of cements or concrete, the DNA chain must produce a covalent bond between the mixture silicates and produced hydroxides, therein temporarily adjusting the ionic concentration (up or down) and reducing and/or removing the sticky and tacky characteristic inherent in most Geopolymer types of cement, and reducing mixture volume change from a higher quality restructuring of the ions during reformation after the protein effect has terminated due to a pH reduction, temperature elevation, or time.

As used herein, the term "Light-Weight Filler Materials" refers to naturally occurring lightweight mineral aggregates and other synthetic materials useful as aggregates and void creating fillers in concrete mixtures. Light-Weight Filler Materials include any natural or synthetic material with a bulk specific gravity of less than 1.0. Light-weight filler materials are used to reduce the composite weight of mixtures for structural weight limitation purposes, to enhance insulation properties, and improve the resistance of mixtures to elevated heat conditions including fires. Light-weight filler materials may include items such as, but not limited to, vermiculite, volcanic cinders, expanded glass, glass bubbles, aluminum bubbles, expanded shale, manmade and or coal combustion by-product cenospheres, synthetic or protein air voids, and other manmade or naturally occurring and void creating materials.

As used herein, the term "Fibers" refers to manmade micro (thin) and macro (thick), or deformed fibers produced commercially for the specific purpose of replacing conventional reinforcing steel, removing or reducing concrete cracking, adjusting modulus characteristics, improving strength, and adjusting concrete mixture rheology. Fibers are typically formed from glass, basalt, and ceramic of variable denier, length, and shape.

As used herein, the term "Slump" refers to a measurement of concrete's workability, or fluidity. It's a direct measurement of concrete consistency or stiffness.

As used herein, the term "Concrete Slump Test" refers to the measurement of a property of fresh concrete and is typically governed by the Standard ASTM C143 test method. The test is an empirical test that measures the workability of fresh concrete, and when used on many batches during larger placements, it measures consistency between batches. The slump test result is a measure of the behavior of a compacted inverted cone of concrete under the action of gravity. It measures the consistency or the wetness of concrete.

The term "about" or "approximately" as used herein means within an acceptable error range for the particular value as determined by one of ordinary skill in the art, which will depend in part on how the value is measured or determined, i.e., the limitations of the measurement system.

Where particular values are described in the application and claims, unless otherwise stated, the term "about" means within an acceptable error range for the particular value.

Unless otherwise indicated, all material requirements are expressed as wt/wt %, understood to be the mass of a particular constituent over the mass of the entire mixture, as indicated, inclusive of water×100%.

The present invention is directed to a density controlled cold fusion concrete cementitious spray applied fireproofing material, particularly to the constituent materials contained therein, and to methods for producing spray applied fireproofing for use in the construction and maintenance industries. The product of the instant invention is useful for protecting steel, wood, concrete, and other construction and industrial materials that require protection from unexpected fire events.

One purpose for the materials and methods disclosed herein is to provide industries, such as the construction industry, with a product that significantly reduces the generation of carbon dioxide and other green-house gases during production, unlike Portland Cement and typical Geopolymer cements. Further, another advantage of the invention is that it utilizes basic processes and materials that may be incorporated into existing production facilities and methodologies. A further purpose is to increase the quality of the product by reducing damage to constructed features from, for example, exposures to climatic conditions (such as extreme or variable weather), extreme heat, damaging chemicals such as chlorides, sulfates, acids, or the like, or impact damage to the spray applied fireproofing from shipping or construction efforts.

It is noted that spray applied or trowel applied fireproofing materials that, when burning during a fire event and where the consumed material may be exposed to humans, must not produce smoke. As such, when the consumed material may be exposed to humans, constituent materials and the balance of such utilized in the processed mixtures that produce smoke when subject to temperatures in excess of 1,999 degrees Fahrenheit, should not be used.

The present invention is broadly directed to a material which includes a mixture of water, acting as a lubricant and activator; at least one of silicon dioxide, expanded glass, glass bubbles, aluminum bubbles, cenospheres (manmade or coal combustion by-products (CCB)), vermiculite, bottom ash, perlite, expanded shale, or other lightweight aggregates of various diameter sizes dependent upon the application method and ranging from about 12.5 mm to 0.025 mm's in diameter; anhydrous or hydrous sodium or potassium metasilicate or pentahydrate acting as an activator; waste from steel production consisting of Granulated Ground Blast Furnace Slag (GGBFS) acting as a cementitious ingredient; high calcium or low calcium waste from coal combustion (Class C or Class F) acting as a cementitious ingredient; sodium tetraborate, sodium citrate dihydrate, citric acid, or boric acid acting as set-time retarders; and, an alkali-resistant micro-fiber to improve rheology and increase strength.

Design methodologies relative to mixture volume and equilibrium unit weight will vary. When pumps are not utilized for conveyance or application purposes, standard design calculations including determining volume and unit weight based upon reported/tested specific gravity can be performed. When pumps are utilized for conveyance or application purposes, liquids will be imposed into the absorptive aggregates. The liquid, or a portion of it, will contain water and sodium or potassium silicate materials that will not wholly volatize; the remaining non-volatized material will increase the specific gravity/unit weight of the materials and must be compensated for in the form of reducing the unit weight due to the increased specific gravity. Methods of compensating for the increased specific gravity include balancing absorptive aggregates, increasing the lower absorptive aggregate concentration, or, installing an air-voiding mechanism such as air entrainment or controlled low strength material additive such as that supplied by Fritz, BASF, W.R. Grace, Euclid, or SIKA at concentrations determined by trial batch tests.

The water should be potable. Mixture constituent balancing will be necessary due to variable water sources with varying pH, mineral content, fluoride, and other chemicals and ingredients. The amount of water should be determined by trial batch tests targeted at obtaining the desired density, strength, and pump-ability in the event a pump is utilized.

The sodium or potassium metasilicate/pentahydrate concentrations are selected based upon other materials, primarily the cementitious materials. The concentration of metasilicate/pentahydrate is generally between about 2 and 25% (wt/wt), preferably between about 2% (wt/wt) and 15% (wt/wt), and most preferably within the range of about 3-15% (wt/wt) of the cementitious materials in order to achieve prescribed compressive strength, bond strength, and heat resistance. In events where the application is in an industrial area subject to an airborne acidic particulate, higher concentrations of metasilicate are desired to increase the layers of silicon or potassium dioxide content and relative resistance to acid attack. In industrial applications subject to acids, the mixture will be resistant to all low acid concentrations except for hydrofluoric acid. Increasing the metasilicate content will inherently increase equilibrium unit weight and therefore, balancing of lightweight or voiding materials must be accomplished. In events where the application is subject to moderate or extreme climatic (temperature) and precipitation events, the metasilicate content is typically maintained above 7 wt % to achieve sufficient strength to resist these effects.

The aggregates should consist of lightweight aggregates with as low a specific gravity as is possible, but normally not greater than 0.60, and that when subject to temperatures in excess of 1,999 degrees Fahrenheit, do not produce smoke. Low absorptive aggregates such as a coated expanded glass have lower liquid absorption properties and are desirable. For pumping purposes, a minimum of 2 sizes are advantageous to reduce the packing properties of gap graded materials during pumping. Rounded particles are advantageous and in most cases, a stable cenosphere resulting from coal combustion or manmade (such as ceramic, aluminum, or glass) is advantageous. The amount of aggregates should be determined by trial batch tests targeted at obtaining the desired density, strength, and pump-ability in the event a pump is utilized. For pneumatic projection spray applied projects, the maximum size of aggregate should be selected based upon the equipment intended, but a maximum nominal aggregate size of about 2 mm is effective.

Either GGBFS or fly ash, or a blend of these materials is used at percentages ranging up to about 60% (wt/wt). Should the addition of desirable amounts of GGBFS or fly ash not achieve the intended compressive strength, calcium hydroxide may be added to about 1% (wt/wt) to about 10% (wt/wt) to increase strength. Typically the overall range falls within about 5% (wt/wt) to about 60% (wt/wt). The amount of either or both materials is dependent upon inherent characteristics including the calcium content, the aluminum content, the carbon content (loss on ignition), and the silicon content. Using a mixture of two or three cementitious materials is advantageous for production purposes in order to reduce the variability effect of one of the materials, should variability incorporate. Both GGBFS and fly ash materials are the product and waste from burning industrial materials at high temperatures and accordingly, both materials have a relative high resistance to heat. Naturally occurring pozzolan materials such as Kaolin clay, attapulgite clay, and other natural or manmade minerals can be utilized; the materials should have elevated (above 50%) silicon dioxide content and should not produce smoke when exposed to temperatures above 1,999 degrees Fahrenheit. Trials are necessary to determine the concentration of each material, but a total cementitious amount of between 400 and 800 pounds per cubic yard is effective.

The set-time retarding materials should be selected based upon the effectiveness of the material in the constituent combination utilized. Generally, if 1-hour of set time is achieved using the most economical material and relative concentration; this is satisfactory to allow finishing of the layer should it be required.

Micro fibers are an important ingredient to reduce cracking of the finished layer as a result of evaporation and autogenous volume change from material polymerization. Alkali resistant glass fibers, ceramic fibers, or basalt fibers are advantageous due to their lower water demand, high heat resistance, and decrease of cohesive mixture shear strength. Any micro fiber can be selected but the fiber should not produce smoke when subject to temperatures above 1,999 degrees Fahrenheit. Trials are necessary to determine the concentration of fibers but generally from about 3 to about 9 pounds per cubic yard are typically effective.

In some cases, where unit weight and volume change efforts are extra-ordinarily problematic, a protein, or a synthetic protein material capable of achieving the same characteristics as a protein, which is capable of forming a weak covalent bond with the hydroxides and silicates, therein altering the ion concentration of the hydroxides and silicates for the purpose of retaining water, maintaining a consistent volume during the curing process, and to reduce the sticky/tacky characteristic of silicates, is utilized. Concentrations of the protein may vary from between about 0.05% (wt/wt) and about 5.0% (wt/wt) of the mass of all ingredients.

Thixotropic properties are advantageous during spray applied applications where materials are pumped. In these events, water contents are many times increased to reduce pump pressures, and to reduce equilibrium densities. Adding very fine but high temperature resistant materials such as, but not limited to silica fume, fumed silica, purified attapulgite clay, and other thixotropic characteristic infusions are helpful to increase applied layer stability, and reduce sagging and sloughing of the wet layer while maintaining or increasing strength.

The above mixture constituents are varied and balanced to achieve wet and dry equilibrium mixture densities as required by project specifications, and ranging from about 20 pcf to 90 pcf, with respective compressive strength varying from about 100 to 5,000 psi. Mixture constituents are varied to ensure no plastic, drying, or autogenous shrinkage cracking occurs.

EXAMPLES

In order to produce an aggregate, void, and cementitious material that can be trowel applied, or pneumatically projected into place that is resistant to the climate variability, water, acids, sulfates, chlorides, and heat exposure up to and exceeding 3 hours at a temperature of 2,000 degrees Fahrenheit (UL heat curve as defined by the UL 1709 procedure), dry materials should be combined, water added, and mixing should progress for as long a period as is possible, but a minimum of 10 seconds in the case of continuous mixing and pumping apparatus, and a maximum of 4 minutes when using non-continuous batching apparatus.

The combined aggregate should be, in terms of mass, from about 15% (wt/wt) to about 50% (wt/wt) of the final cementitious mixture mass including water. The combined aggregate individual and overall concentration should be adjusted and balanced to achieve pump-ability in the case of pneumatic applications, strength, and unit weight density. The volume of aggregate and cementitious materials is balanced to achieve the unit weight density specified for the project, which may vary from about 25 pcf to about 100 pcf.

Cementitious materials should be combined with the dry aggregate materials prior to bagging or other packaging. The cementitious materials should include at least one of fly ash (Class C or Class F) and Granulated Ground Blast Furnace Slag (GGBFS). The fly ash and Granulated Ground Blast Furnace Slag (GGBFS), should be added in variable concentrations dependent upon mixture strength, volume change, carbonation, and rheological behavior to mass concentrations ranging from a combined total of about 5.0% (wt/wt) to about 50% (wt/wt). The fly ash and GGBFS concentrations of the mixture should be selected by balancing fly ash and/or GGBFS mass and volume amounts in mixture designs until characteristics are as specified by project requirements.

The cementitious materials should include sodium or potassium metasilicate, or sodium or potassium metasilicate pentahydrate, added in variable concentrations dependent upon mixture strength, volume change, carbonation, and rheological behavior to mass concentrations ranging from about 2% (wt/wt) to about 15% (wt/wt). The concentration of sodium or potassium metasilicate or pentahydrate in the mixture should be selected by balancing the mass and volume amounts in mixture designs until characteristics comply with project requirements. During events where mixing times are very short such as continuous mixing and pumping for spray applications, elevating the pentahydrate content is many times beneficial to ensure complete incorporation of silicate materials.

The cementitious materials may include sodium tetraborate, sodium citrate dihydrate, or, citric, boric, or silicic acid, added in variable concentrations ranging from about 0.0% (wt/wt) to about 15.0% (wt/wt) by mass of the mixture including water, to extend the time of set and/or working time.

Protein is added as a portion of the cementitious material in concentrations ranging from about 0.05% (wt/wt) to about 5% (wt/wt), with the proviso that protein is provided at the minimum concentration which will produce a covalent bond between mixture silicates and produced hydroxides therein temporarily removing the mixture sticky/tacky characteristic and reducing mixture volume change.

Water is added to the mixture in mass amounts ranging from about 7% (wt/wt) to about 30% (wt/wt), such that the concentration of water is effective to produce slump consistencies and other characteristics that comply with project requirements for the intended purpose ranging from a trowel applied vertical or overhead repair or coating, to spray applied coating materials for various structural items including metal, concrete, and wood.

When all constituents are combined, the material should be mixed for from 10 seconds to 4 minutes prior to placement. After placement, curing in any convenient ambient environment may occur until specified strength is achieved, or the curing may be expedited by elevating the temperature around the material to from about 95° F. to about 180° F. Electrical curing can occur by adjusting the voltage and amperage to appropriate values and pulsing the electrical current through the concrete until desired strength is achieved.

The mixture has been formulated in accordance with the examples in Tables 1 through 4, as set forth below.

TABLE 1

Mixtures:

| | MORTAR CONSISTENCY | | | | | |
|---|---|---|---|---|---|---|
| | Low Slump Trowel Applied (1" to 3" Slump) | | Medium Slump Spray Applied (2" to 6" Slump) | | Low Range | High Range |
| Expanded Glass 1-2 mm, lbs - % | 190.7 | 12.7% | 191.3 | 12.4% | 5.00% | 20.00% |
| Expanded Glass 0.5-1 mm, lbs - % | 223.8 | 14.9% | 174.3 | 11.3% | 5.00% | 20.00% |
| Size #3 Vermiculite, lbs - % | 0.0 | 0% | 59.5 | 3.9% | 0.00% | 20.00% |
| GGBFS, lbs - % | 253.4 | 16.9% | 330.2 | 21.4% | 5.00% | 45.00% |
| Class F Fly Ash, lbs - % | 405.0 | 27% | 330.2 | 21.4% | 5.00% | 45.00% |
| Sodium Metasilicate, lbs - % | 93.5 | 6.2% | 132.1 | 8.6% | 3.00% | 15.00% |
| Sodium Tetraborate, lbs - % | 62.3 | 4.2% | 0 | 0% | 0.00% | 15.00% |
| 6 mm" Glass Micro Fibers, lbs - % | 8.0 | 0.53% | 8 | 0.52% | 0.05% | 10.00% |
| Fumed Silica, lbs - % | 0.0 | 0% | 12.6 | 0.82% | 0.00% | 5.00% |
| Protein, lbs - % | 2.1 | 0.14% | 2.1 | 0.14% | 0.05% | 5.00% |
| SIKA CLSM Entrainment, lbs - % | 0.0 | 0% | 4 | 0.26% | 0.00% | 5.00% |
| Water, lbs - % | 263.7 | 17.6% | 297.9 | 19.3% | 5.00% | 30.00% |
| Test Results, cured at 75° Fahrenheit and approximately 50% humidity: | | | | | | |
| Strength, 24 hours, psi | 390 | | 210 | | | |
| Strength, 28 days, psi | 2,250 | | 1,730 | | | |
| Equilibrium Density, pcf | 50.3 | | 53.5 | | | |
| Bond Strength, 28 Days, psf | 21,000 | | 14,880 | | | |

TABLE 1-continued

| | Mixtures: | | | |
|---|---|---|---|---|
| | MORTAR CONSISTENCY | | | |
| | Low Slump Trowel Applied (1" to 3" Slump) | Medium Slump Spray Applied (2" to 6" Slump) | Low Range | High Range |
| Test Results, cured at 120° Fahrenheit and approximately 50% humidity: | | | | |
| Strength, 8 hours, psi | 1,100 | 850 | | |
| Strength, 24 hours, psi | 2,110 | 1,770 | | |
| Equilibrium Density, pcf | 50.3 | 53.5 | | |
| Bond Strength, 28 Days, psf | 21,750 | 14,210 | | |
| Heat Exposure Test At A Temperature Of 2,000° F. (UL Heat Curve As Defined By The UL 1709 Procedure) Spray Applied Layer Average Non-Exposed Thermocouple Temperature (° F.), ⅞" Thickness on ¼" steel: | | | | |
| 1-hour | | 832 | | |
| 2-hours | | 913 | | |
| 3-hours | | 931 | | |
| Spray Applied Layer Average Non-Exposed Thermocouple Temperature (° F.), 1⅛" Thickness on ¼" steel: | | | | |
| 1-hour | | 744 | | |
| 2-hours | | 867 | | |
| 3-hours | | 885 | | |
| Spray Applied Layer Average Non-Exposed Thermocouple Temperature (° F.), 1⅜" Thickness on ¼" steel: | | | | |
| 1-hour | | 639 | | |
| 2-hours | | 840 | | |
| 3-hours | | 851 | | |
| Spray Applied Layer Average Non-Exposed Thermocouple Temperature (° F.), 1⅝" Thickness on ¼" steel: | | | | |
| 1-hour | | 428 | | |
| 2-hours | | 751 | | |
| 3-hours | | 772 | | |

TABLE 2

| | Mixtures: | | | | | |
|---|---|---|---|---|---|---|
| | MORTAR CONSISTENCY | | | | | |
| | Low Slump Trowel Applied (1" to 3" Slump) | | Medium Slump Spray Applied (2" to 6" Slump) | | Low Range | High Range |
| Expanded Glass 1-2 mm, lbs - % | 320.3 | 21.5% | 284.2 | 18.1% | 5.00% | 30.00% |
| Cenospheres, lbs - % | 50.2 | 3.4% | 50.2 | 3.2% | 5.00% | 20.00% |
| 3M Glass Bubbles .05 to .1 mm, lbs - % | 33.1 | 2.2% | 33.1 | 2.1% | 0.05% | 20.00% |
| Size #3 Vermiculite, lbs - % | 0 | 0% | 59.5 | 3.8% | 0.00% | 10.00% |
| Perlite - .3 to 1 mm, lbs - % | 111.4 | 7.5% | 111.4 | 7.1% | 0.00% | 15.00% |
| GGBFS, lbs - % | 303.7 | 20.4% | 303.7 | 13.3% | 5.00% | 45.00% |
| Class F Fly Ash, lbs - % | 303.7 | 20.4% | 303.7 | 19.3% | 5.00% | 45.00% |
| Sodium Metasilicate, lbs - % | 101.0 | 6.8% | 101.0 | 6.4% | 3.00% | 15.00% |
| Sodium Tetraborate, lbs - % | 55.1 | 3.7% | 55.1 | 3.5% | 1.00% | 15.00% |
| 6 mm" Glass Micro Fibers, lbs - % | 5 | 0.34% | 8 | 0.51% | 0.05% | 10.00% |
| Fumed Silica, lbs - % | 2 | 0.13% | 8.5 | 0.54% | 0.05% | 5.00% |
| Protein, lbs - % | 6.1 | 0.41% | 6.1 | 0.39% | 0.05% | 5.00% |
| Water, lbs - % | 198.6 | 13.3% | 245.8 | 15.7% | 5.00% | 30.00% |
| Test Results, cured at 75° Fahrenheit and approximately 50% humidity: | | | | | | |
| Strength, 24 hours, psi | 285 | | 235 | | | |
| Strength, 28 days, psi | 1,880 | | 1,390 | | | |
| Equilibrium Density, pcf | 51.8 | | 49.2 | | | |
| Bond Strength, 28 Days, psf | 18,550 | | 15,230 | | | |
| Test Results, cured at 120° Fahrenheit and approximately 50% humidity: | | | | | | |
| Strength, 8 hours, psi | 970 | | 805 | | | |
| Strength, 24 hours, psi | 1,905 | | 1,740 | | | |
| Equilibrium Density, pcf | 51.8 | | 49.2 | | | |
| Bond Strength, 28 Days, psf | 21,310 | | 19,890 | | | |

TABLE 2-continued

Mixtures:

MORTAR CONSISTENCY

| | Low Slump Trowel Applied (1" to 3" Slump) | Medium Slump Spray Applied (2" to 6" Slump) | Low Range | High Range |
|---|---|---|---|---|
| Heat Exposure Test At A Temperature Of 2,000° F. (UL Heat Curve As Defined By The UL 1709 Procedure) Spray Applied Layer Average Non-Exposed Thermocouple Temperature (° F.), ⅞" Thickness on ¼" steel: | | | | |
| 1-hour | | 885 | | |
| 2-hours | | 910 | | |
| 3-hours | | 920 | | |
| Spray Applied Layer Average Non-Exposed Thermocouple Temperature (° F.), 1⅛" Thickness on ¼" steel: | | | | |
| 1-hour | | 709 | | |
| 2-hours | | 786 | | |
| 3-hours | | 799 | | |
| Spray Applied Layer Average Non-Exposed Thermocouple Temperature (° F.), 1⅜" Thickness on ¼" steel: | | | | |
| 1-hour | | 588 | | |
| 2-hours | | 710 | | |
| 3-hours | | 750 | | |
| Spray Applied Layer Average Non-Exposed Thermocouple Temperature (° F.), 1⅝" Thickness on ¼" steel: | | | | |
| 1-hour | | 444 | | |
| 2-hours | | 625 | | |
| 3-hours | | 715 | | |

TABLE 3

Mixtures:

MORTAR CONSISTENCY

| | Low Slump Trowel Applied (1" to 3" Slump) | | Medium Slump Spray Applied (2" to 6" Slump) | | Low Range | High Range |
|---|---|---|---|---|---|---|
| Perlite - 1 to 2 mm, lbs - % | 205.8 | 17.39% | 177.6 | 15.4% | 0.05% | 30.00% |
| Cenospheres, lbs - % | 80.3 | 6.78% | 75 | 6.5% | 5.00% | 20.00% |
| Perlite - .3 to 1 mm, lbs - % | 20.1 | 1.7% | 12.3 | 1.1% | 0.00% | 15.00% |
| GGBFS, lbs - % | 560.3 | 47.3% | 560.3 | 48.6% | 5.00% | 60.00% |
| Sodium Metasilicate, lbs - % | 98.8 | 8.4% | 82.3 | 7.1% | 3.00% | 15.00% |
| Sodium Tetraborate, lbs - % | 35.5 | 3.0% | 27.3 | 2.4% | 1.00% | 15.00% |
| 6 mm" Glass Micro Fibers, lbs - % | 5.0 | 0.42% | 8.0 | 0.69% | 0.05% | 10.00% |
| Fumed Silica, lbs - % | 2.0 | 0.17% | 6.5 | 0.56% | 0.05% | 5.00% |
| Protein, lbs - % | 2.0 | 0.17% | 2.0 | 0.17% | 0.05% | 5.00% |
| Water, lbs - % | 173.9 | 14.7% | 201.4 | 17.5% | 5.00% | 30.00% |
| Test Results, cured at 75° Fahrenheit and approximately 50% humidity: | | | | | | |
| Strength, 24 hours, psi | 215 | | 165 | | | |
| Strength, 28 days, psi | 1,240 | | 990 | | | |
| Equilibrium Density, pcf | 53.1 | | 49.0 | | | |
| Bond Strength, 28 Days, psf | 14,430 | | 11,990 | | | |
| Test Results, cured at 120° Fahrenheit and approximately 50% humidity: | | | | | | |
| Strength, 8 hours, psi | 670 | | 505 | | | |
| Strength, 24 hours, psi | 1,190 | | 1,510 | | | |
| Equilibrium Density, pcf | 52.3 | | 54.4 | | | |
| Bond Strength, 28 Days, psf | 14,310 | | 12,005 | | | |
| Heat Exposure Test At A Temperature Of 2,000° F. (UL Heat Curve As Defined By The UL 1709 Procedure) Spray Applied Layer Average Non-Exposed Thermocouple Temperature (° F.), ⅞" Thickness on ¼" steel: | | | | | | |
| 1-hour | | | 799 | | | |
| 2-hours | | | 857 | | | |
| 3-hours | | | 911 | | | |
| Spray Applied Layer Average Non-Exposed Thermocouple Temperature (° F.), 1⅛" Thickness on ¼" steel: | | | | | | |
| 1-hour | | | 795 | | | |
| 2-hours | | | 825 | | | |
| 3-hours | | | 888 | | | |

TABLE 3-continued

| | Mixtures: | | | |
|---|---|---|---|---|
| | MORTAR CONSISTENCY | | | |
| | Low Slump Trowel Applied (1" to 3" Slump) | Medium Slump Spray Applied (2" to 6" Slump) | Low Range | High Range |
| Spray Applied Layer Average Non-Exposed Thermocouple Temperature (° F.), 1⅜" Thickness on ¼" steel: | | | | |
| 1-hour | | 628 | | |
| 2-hours | | 770 | | |
| 3-hours | | 855 | | |
| Spray Applied Layer Average Non-Exposed Thermocouple Temperature (° F.), 1⅝" Thickness on ¼" steel: | | | | |
| 1-hour | | 489 | | |
| 2-hours | | 589 | | |
| 3-hours | | 734 | | |

TABLE 4

| | Mixtures: | | | | | |
|---|---|---|---|---|---|---|
| | MORTAR CONSISTENCY | | | | | |
| | Low Slump Trowel Applied (1" to 3" Slump) | | Medium Slump Spray Applied (2" to 6" Slump) | | Low Range | High Range |
| Perlite - 1 to 2 mm, lbs - % | 202.7 | 17.5% | 199.3 | 16.7% | 5.00% | 30.00% |
| Calcium Hydroxide, lbs - % | 49.6 | 4.3% | 50.0 | 4.2% | 5.00% | 20.00% |
| Size #3 Vermiculite, lbs - % | 35.8 | 3.1% | 36 | 3.0% | 0.00% | 15.00% |
| Class F Fly Ash, lbs - % | 495.8 | 42.8% | 502.2 | 42.0% | 5.00% | 60.00% |
| Sodium Metasilicate, lbs - % | 112.3 | 9.7% | 114.9 | 9.6% | 3.00% | 15.00% |
| Sodium Tetraborate, lbs - % | 65.4 | 5.6% | 56.6 | 4.7% | 0.00% | 15.00% |
| 6 mm" Glass Micro Fibers, lbs - % | 6.0 | 0.52% | 8.0 | 0.67% | 0.01% | 10.00% |
| Fumed Silica, lbs - % | 2.0 | 0.17% | 2.0 | 0.17% | 0.00% | 5.00% |
| Protein, lbs - % | 2.0 | 0.17% | 2.0 | 0.17% | 0.05% | 5.00% |
| Water, lbs - % | 188.3 | 16.2% | 225.8 | 18.9% | 5.00% | 30.00% |
| Test Results, cured at 75° Fahrenheit and approximately 50% humidity: | | | | | | |
| Strength, 24 hours, psi | 580 | | 465 | | | |
| Strength, 28 days, psi | 2,450 | | 2,405 | | | |
| Equilibrium Density, pcf | 51.2 | | 52.8 | | | |
| Bond Strength, 28 Days, psf | 22,860 | | 25,140 | | | |
| Test Results, cured at 120° Fahrenheit and approximately 50% humidity: | | | | | | |
| Strength, 8 hours, psi | 2,370 | | 2440 | | | |
| Strength, 24 hours, psi | 2,405 | | 2,510 | | | |
| Equilibrium Density, pcf | 55.3 | | 52.8 | | | |
| Bond Strength, 28 Days, psf | 21,000 | | 23,880 | | | |
| Heat Exposure Test At A Temperature Of 2,000° F. (UL Heat Curve As Defined By The UL 1709 Procedure) Spray Applied Layer Average Non-Exposed Thermocouple Temperature (° F.), ⅞" Thickness on ¼" steel: | | | | | | |
| 1-hour | | | 731 | | | |
| 2-hours | | | 805 | | | |
| 3-hours | | | 922 | | | |
| Spray Applied Layer Average Non-Exposed Thermocouple Temperature (° F.), 1⅛" Thickness on ¼" steel: | | | | | | |
| 1-hour | | | 610 | | | |
| 2-hours | | | 723 | | | |
| 3-hours | | | 842 | | | |
| Spray Applied Layer Average Non-Exposed Thermocouple Temperature (° F.), 1⅜" Thickness on ¼" steel: | | | | | | |
| 1-hour | | | 577 | | | |
| 2-hours | | | 688 | | | |
| 3-hours | | | 799 | | | |
| Spray Applied Layer Average Non-Exposed Thermocouple Temperature (° F.), 1⅝" Thickness on ¼" steel: | | | | | | |
| 1-hour | | | 365 | | | |
| 2-hours | | | 592 | | | |
| 3-hours | | | 653 | | | |

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A sprayable, fire resistant, cold fusion concrete formulation containing a geopolymer cement that uses no liquid hydroxide additives as a primary activator or a pH elevator, and wherein said formulation exhibits an equilibrium density of less 60 pounds per cubic foot and a cured compressive strength above 1,000 pounds per square inch, said formulation comprising:
   - 15-50 wt % of at least two aggregates of different sizes, each aggregate exhibiting a diameter ranging from about 0.025 mm to about 12.5 mm and having a bulk specific gravity of not greater than 0.60 and that when subject to temperatures in excess of 1,999° F. do not produce smoke, said lightweight aggregates being selected from the group consisting of silicon dioxide, expanded glass, manmade or coal combustion by-product cenospheres, vermiculite, volcanic cinders, expanded glass, glass bubbles, aluminum bubble, bottom ash, perlite, and expanded shale;
   - 2-25 wt % of at least one geopolymer activator consisting of sodium metasilicate, potassium metasilicate, sodium pentahydrate, or potassium pentahydrate;
   - 5-60 wt % of at least one geopolymer cementitious material comprising granulated ground blast furnace slag;
   - up to 15 wt % of at least one set-time retarder comprising sodium tetraborate, sodium citrate dihydrate, citric acid, or boric acid;
   - 0.05-5 wt % of a water retention and volume maintenance aid comprising at least one protein material or synthetic protein material comprising biomolecules, macromolecules, or amino acid residues;
   - about 3 to about 9 pounds per cubic yard of at least one alkali-resistant fiber comprising fibers formed from glass, basalt, or ceramic; and
   - water.

2. A geopolymer, density-controlled, fire resistant formulation according to claim 1 comprising sufficient water to spray said formulation onto structural items of metal, concrete, or wood and form a fire resistant coating said structural items.

3. A geopolymer, density-controlled, fire resistant formulation according to claim 1 exhibiting a constructed design equilibrium density of below 60 pounds per cubic foot and a compressive strength above 1,000 pounds per square inch.

4. A geopolymer, density-controlled, fire resistant formulation according to claim 1 comprising sufficient protein to retain water, maintain a consistent volume during curing, and to reduce sticky/tacky characteristics of said formulation.

5. A geopolymer, density-controlled, fire resistant formulation according to claim 1 further comprising 1-10 wt % calcium hydroxide.

6. A geopolymer, density-controlled, fire resistant formulation according to claim 1 further comprising up to 5 wt % of finely divided silica fume, fumed silica, or purified attapulgite clay in an amount to increase applied layer stability, reduce sagging and sloughing of a wet applied layer while maintaining or increasing strength.

7. A sprayable, fire resistant, cold fusion concrete formulation containing a geopolymer cement that uses no liquid hydroxide additives as a primary activator or a pH elevator, wherein said formulation exhibits an equilibrium density of less 60 pounds per cubic foot and a cured compressive strength above 1,000 pounds per square inch, said formulation comprising ingredients and concentrations according to the following table:

| Ingredient | Concentration Range (wt %) |
| --- | --- |
| Expanded Glass 1-2 mm | 5-20 |
| Size #3 Vermiculite | 0-20 |
| GGBFS | 5-45 |
| Class F Fly Ash | 5-45 |
| Sodium Metasilicate | 3-15 |
| Sodium Tetraborate | 0-15 |
| 6 mm Glass Micro Fibers | 0.05-10 |
| Fumed Silica | 0-5 |
| Protein | 0.05-5 |
| Water | 5-30. |

8. A geopolymer, fire resistant formulation according to claim 7 comprising vermiculite.

9. A geopolymer, fire resistant formulation according to claim 7 comprising sodium tetraborate.

10. A geopolymer, fire resistant formulation according to claim 7 comprising fumed silica.

11. A geopolymer, fire resistant formulation according to claim 7 further comprising sodium tetraborate in an amount sufficient to retard setting of said formulation.

12. A sprayable, fire resistant, cold fusion concrete formulation containing a geopolymer cement that uses no liquid hydroxide additives as a primary activator or a pH elevator, wherein said formulation exhibits an equilibrium density of less 60 pounds per cubic foot and a cured compressive strength above 1,000 pounds per square inch, said formulation comprising ingredients and concentrations according to the following table:

| Ingredient | Concentration (wt %) |
| --- | --- |
| Perlite - 1 to 2 mm | 5-30 |
| Calcium Hydroxide | 5-20 |
| Size #3 Vermiculite | 0-15 |
| Fly Ash | 5-60 |
| Sodium Metasilicate | 3-15 |
| Sodium Tetraborate | 0-15 |
| 6 mm Glass Micro Fibers | 0.01-10 |
| Fumed Silica | 0-5 |
| Protein | 0.05-5 |
| Water | 5-30. |

13. A geopolymer, fire resistant formulation according to claim 12 comprising vermiculite.

14. A geopolymer, fire resistant formulation according to claim 12 comprising sodium tetraborate.

15. A geopolymer, fire resistant formulation according to claim 1 wherein said formulation exhibits an equilibrium density of about 50 pounds per cubic foot.

16. A process for protecting steel, wood, and concrete structures from unexpected fire events by a process that comprises applying to said structures a coating of the formulation according to claim 1.

17. A process for protecting steel, wood, and concrete structures from unexpected fire events by a process that comprises applying to said structures a coating of the formulation according to claim 7.

18. A process for protecting steel, wood, and concrete structures from unexpected fire events by a process that comprises applying to said structures a coating of the formulation according to claim 12.

\* \* \* \* \*